United States Patent
Iwanaga et al.

(10) Patent No.: US 8,021,787 B2
(45) Date of Patent: Sep. 20, 2011

(54) HIGH-VOLTAGE CHARGE TYPE NONAQUEOUS ELECTROLYTE SECONDARY CELL

(75) Inventors: Masato Iwanaga, Morguchi (JP); Kentaro Takahashi, Moriguchi (JP); Yukihiro Oki, Moriguchi (JP); Yoshihiko Ikeda, Moriguchi (JP); Akira Kinoshita, Moriguchi (JP); Nobumichi Nishida, Moriguchi (JP)

(73) Assignee: Sanyo Electric Co., Ltd., Moriguchi-shi (JP)

( * ) Notice: Subject to any disclaimer, the term of this patent is extended or adjusted under 35 U.S.C. 154(b) by 248 days.

(21) Appl. No.: 12/302,713

(22) PCT Filed: May 30, 2007

(86) PCT No.: PCT/JP2007/060952
§ 371 (c)(1),
(2), (4) Date: Mar. 27, 2009

(87) PCT Pub. No.: WO2007/139130
PCT Pub. Date: Dec. 6, 2007

(65) Prior Publication Data
US 2009/0181311 A1    Jul. 16, 2009

(30) Foreign Application Priority Data

May 31, 2006  (JP) ................................. 2006-152066
Mar. 30, 2007  (JP) ................................. 2007-092724

(51) Int. Cl.
*H01M 4/58* (2010.01)
(52) U.S. Cl. ................ 429/231.3; 429/231.1; 429/231.6; 429/231.5; 429/218.1; 429/231.8; 429/231.4; 429/337; 429/330; 429/331
(58) Field of Classification Search ................ 429/231.3, 429/231.1, 231.6, 231.5, 218.1, 231.8, 231.4, 429/337, 330, 331
See application file for complete search history.

(56) References Cited

U.S. PATENT DOCUMENTS 5,962,167 A    10/1999  Nakai et al.
6,720,113 B2 *  4/2004  Goto et al. ................ 429/231.95

| | | | |
|---|---|---|---|
| 2003/0162099 A1 | 8/2003 | Bowden et al. | |
| 2005/0074670 A1 | 4/2005 | Azuma | |
| 2005/0266315 A1 | 12/2005 | Sato et al. | |
| 2006/0199077 A1 * | 9/2006 | Iwanaga et al. | 429/231.3 |
| 2006/0216605 A1 * | 9/2006 | Shirakata et al. | 429/231.3 |

FOREIGN PATENT DOCUMENTS

| CN | 1497763 A | 5/2004 |
|---|---|---|
| CN | 1639893 A | 7/2005 |
| JP | 63-152886 A | 6/1988 |
| JP | 10-149830 A | 6/1998 |
| JP | 10-154532 A | 6/1998 |
| JP | 2000-40524 A | 2/2000 |
| JP | 2000-149985 A | 5/2000 |
| JP | 2002-83602 A | 3/2002 |
| JP | 2002-298849 A | 10/2002 |
| JP | 2003-168429 A | 6/2003 |
| JP | 2003-308842 A | 10/2003 |
| JP | 2005-71641 A | 3/2005 |
| JP | 2005-116398 A | 4/2005 |
| JP | 2005-183195 A | 7/2005 |
| JP | 2005-317499 A | 11/2005 |
| JP | 2005-339970 A | 12/2005 |
| JP | 2007-200821 A | 8/2007 |

OTHER PUBLICATIONS

International Search Report of PCT/JP2007/060952, date of mailing Aug. 28, 2007.

* cited by examiner

*Primary Examiner* — Laura Weiner
(74) *Attorney, Agent, or Firm* — Westerman, Hattori, Daniels & Adrian, LLP

(57) ABSTRACT

The preservation performance of a nonaqueous electrolyte secondary cell charged to high potential is improved while the initial capacity and the cycle property of the cell are also improved. The nonaqueous electrolyte secondary cell includes: a positive electrode having lithium phosphate and a positive electrode active material containing lithium cobalt compound oxide and lithium manganese nickel compound oxide having a layer structure, the lithium cobalt compound oxide having at least zirconium and magnesium added in $LiCoO_2$; a negative electrode having a negative electrode active material; and a nonaqueous electrolyte having a nonaqueous solvent and an electrolytic salt. The potential of the positive electrode is more than 4.3 V and 5.1 V or less based on lithium. The nonaqueous electrolyte contains vinylene carbonate as the nonaqueous solvent and, as the electrolytic salt, at least one of lithium bis(pentafluoroethane sulfonyl) imide and lithium bis(trifluoromethane sulfonyl)imide at 0.1 M or more and 0.5 M or less. The nonaqueous electrolyte contains 1,3-dioxane.

8 Claims, No Drawings

HIGH-VOLTAGE CHARGE TYPE NONAQUEOUS ELECTROLYTE SECONDARY CELL

TECHNICAL FIELD

The present invention relates to a nonaqueous electrolyte secondary cell, and more particularly to a high-voltage charge type nonaqueous electrolyte secondary cell, which is used with the positive electrode charged to high potential.

BACKGROUND ART

Today, mobile information terminals such as mobile phones, laptop computers, and PDAs have been rapidly enhanced in functionality and compactness and reduced in weight. As the driving power sources for these terminals, nonaqueous electrolyte secondary cells represented by lithium ion secondary cells, which have high energy density and high capacity, are widely used. However, in recent years, with further enhancement in the functionality of these appliances, there has been a need for further enhancement in the capacity of the cells.

In view of this, as a measure to enhance the capacity of the cells, such a technique is proposed that cell capacity is increased by, for example, charging the positive electrode to a potential higher than 4.3V to enhance the use efficiency of the positive electrode active material. For example, such a technique is proposed that a positive electrode active material in which lithium cobalt oxide with different elements added therein and lithium nickel-manganese oxide having a layer structure are mixed with one another is used (e.g., patent document 1).

[Patent document 1] Japanese Patent Application Publication No. 2005-317499.

In these techniques, the structural stability of the lithium cobalt oxide during charging at a potential higher than a positive electrode potential of 4.3 V (based on lithium) is improved by adding different elements such as Zr and Mg to the lithium cobalt oxide. Also thermal stability on a high potential level is improved by providing the lithium nickel-manganese oxide with a layer structure. Such a technique is proposed that by using a mixture of these two compound oxides, stability during high voltage charging is enhanced. Also such a technique is proposed that by adding lithium phosphate to the positive electrode, a charge/discharge property at high voltage is improved.

However, these techniques pose the following problems. If these techniques are used, although the resistance of the positive electrode active material against high voltage charging is enhanced, the electrolyte is oxidatively decomposed at the positive electrode side during high voltage charging, thereby compromising cell preservation performance and a cycle property. Also, there is such a problem that especially under high temperature conditions, cobalt is eluted into the electrolyte solution and precipitates on the surface of the negative electrode, thereby degrading the preservation property and the cycle property.

Prior art techniques related to improvement in a charge/discharge cycle property are disclosed in, for example, patent documents 2 to 4.

[Patent document 2] Japanese Patent Application Publication No. 63-152886.

[Patent document 3] Japanese Patent Application Publication No. 2003-308842.

[Patent document 4] Japanese Patent Application Publication No. 2005-71641.

Patent document 2 discloses such a technique that in a nonaqueous electrolyte secondary cell comprising: a negative electrode having lithium or an alloy containing lithium as an active material; a positive electrode having manganese dioxide as an active material; and a nonaqueous electrolyte solution composed of a solvent and a solute, a mixture solvent containing 1,3-dioxane is used as a solvent for the nonaqueous electrolyte solution. According to this technique, although the charge/discharge cycle property can be improved because, for example, the growth of lithium dendrite can be inhibited, this technique is not intended to solve the above problems related to the high voltage charge type cells.

Patent document 3 discloses such a technique that lithium manganese nickel compound oxide and lithium phosphate are used as the positive electrode. According to this technique, a cell that excels in charge/discharge efficiency at high voltage can be obtained. Patent document 4 discloses such a technique that by adding lithium phosphate to a nonaqueous electrolyte solution that uses $LiPF_6$, the occurrence of hydrofluoric acid is inhibited. However, use of these techniques cannot sufficiently inhibit the elution of cobalt and the decomposition of the electrolyte solution when the positive electrode is charged to a potential higher than 4.3 V based on lithium.

DISCLOSURE OF THE INVENTION

Problems that the Invention is to Solve

It is an object of the present invention to realize a nonaqueous electrolyte secondary cell that has improved charge preservation performance when used at a high positive electrode potential in excess of 4.3 V and 5.1 V or lower, that has high capacity, and that excels in preservation performance and also in cycle property.

Means to Solve the Problems

As a basic configuration of the present invention to accomplish the above object, a nonaqueous electrolyte secondary cell is characterized in comprising: a positive electrode having a positive electrode active material containing a lithium element; a negative electrode having a negative electrode active material; and a nonaqueous electrolyte having a nonaqueous solvent and an electrolytic salt, wherein: a potential of the positive electrode is more than 4.3 V and 5.1 V or less based on lithium; and the nonaqueous electrolyte contains 1,3-dioxane.

In a conventional nonaqueous electrolyte secondary cell charged in a high positive electrode potential area exceeding 4.3 V, the electrolyte is oxidatively decomposed at the positive electrode side during charging, thereby significantly degrading charge preservation performance (preservation recovery ratio) and a high-temperature cycle property. Thus, the advantages of increased capacity by high voltage charging could not be obtained sufficiently. This problem is overcome by the above configuration of containing 1,3-dioxane in the electrolyte. That is, if 1,3-dioxane is contained in the electrolyte, the 1,3-dioxane is first decomposed on the positive electrode side to form a covering on the surface of the positive electrode active material, and this covering functions as a protection covering to inhibit the decomposition of the electrolyte components (solvent and electrolytic salt). Thus, the degradation of cell performance caused by the oxidative decomposition of the electrolyte at the positive electrode is inhibited. Thus, according to the above configuration, a high-capacity nonaqueous electrolyte secondary cell with excellent charge preservation performance (preservation recovery ratio) is realized.

In the above configuration, the charge potential of the positive electrode is more than 4.3 V and 5.1 V or less based on lithium because if the potential of the positive electrode is 4.3 V or less there are substantially no problems such as the elution of cobalt and the decomposition of the electrolyte solution caused by high potential, while secondary cells with a positive electrode potential in excess of 5.1 V are outside the scope of the present invention. It should be noted that in the present specification, 1,3-dioxane is treated as an additive for the nonaqueous electrolyte and therefore is not encompassed by the "nonaqueous solvent."

In the above basic configuration according to the present invention, such a configuration is possible that the positive electrode contains lithium phosphate.

With this configuration, the above effect of adding 1,3-dioxane and the reducing effect of lithium phosphate on the reactivity between the lithium cobalt oxide and the nonaqueous electrolyte synergistically affect one another, and as a result, a cell discharge property after preservation, as well as the cell preservation recovery ratio, is further significantly improved.

Also in the configuration where the positive electrode contains lithium phosphate, such a configuration is possible that the ratio of the lithium phosphate to the total mass of the positive electrode active material and the lithium phosphate is 0.01 mass % or more and 5 mass % or less.

If the amount of the lithium phosphate is less than 0.01 mass %, a sufficient effect cannot be observed, while in excess of 5 mass % the effect of reducing the amount of the positive electrode active material (negative effect) overwhelms the effect of adding the lithium phosphate. In view of this, the ratio of the lithium phosphate to the total mass of the positive electrode active material and the lithium phosphate is preferably 0.01 mass % or more and 5 mass % or less.

Also in the above basic configuration according to the present invention, such a configuration is possible that the negative electrode active material is made of noncrystalline carbon-covered graphite particles, the surface of each of the graphite particles being covered with a covering layer containing noncrystalline carbon, and the noncrystalline carbon-covered graphite particles may have a heating peak at 550° C. or higher and 620° C. or lower according to a differential thermal analysis in an air atmosphere, the heating peak having a peak area of 100 μV·s/mg or more and 500 μV·s/mg or less at a temperature rising rate of 5° C./min.

With a negative electrode active material made of noncrystalline carbon-covered graphite particles each covered with a covering layer containing noncrystalline carbon, the high-temperature cycle property improves while at the same time the charge preservation performance (preservation recovery ratio) further improves.

In any of the above aspects of the present invention, such a configuration is possible that the positive electrode active material is a mixture of lithium cobalt compound oxide and lithium manganese nickel compound oxide having a layer structure, the lithium cobalt compound oxide having at least one element selected from the group consisting of Mg, Al, Ti, and Zr, the at least one element being added in $LiCoO_2$.

Lithium cobalt oxide containing a different element excels in structural stability at high voltage, and lithium manganese nickel compound oxide having a layer structure excels in thermal stability at high voltage. Thus, a positive electrode that uses them is useful as a positive electrode for high potential charging, but when a nonaqueous electrolyte secondary cell that uses such positive electrode is charged or discharged at a high potential of more than 4.3 V and 5.1 V or less (based on positive electrode/lithium), the nonaqueous electrolyte is easily oxidatively decomposed at the positive electrode side, and thus the advantageous effects of excellent structural stability and thermal stability do not sufficiently help improve cell performance. The 1,3-dioxane exhibits its effect of addition especially in the system using the above positive electrode active material, and therefore, with the above configuration, a high-capacity nonaqueous electrolyte secondary cell that excels in charge preservation performance and high-temperature cycle property can be realized.

Also in any of the above aspects of the present invention, such a configuration is possible that vinylene carbonate is contained at 0.5 mass % or more and 5 mass % or less relative to the total mass of the nonaqueous solvent.

Vinylene carbonate (VC) reacts with the negative electrode to form a stable covering and thus improves the cycle property. Thus, with the above configuration, the vinylene carbonate forms a protection covering over the negative electrode while the 1,3-dioxane forms a protection covering over the positive electrode, and these collaborate to significantly inhibit the reduction in cycle property caused by the decomposition of the electrolyte.

Although the vinylene carbonate is effective only at a small amount, at less than 0.5 mass % the effect of improving the cycle property is insufficient while in excess of 5 mass % the initial capacity of the cell reduces. In view of this, the content of the vinylene carbonate is preferably 0.5 to 5 mass % relative to the sum of the mass of the nonaqueous solvent.

In any of the above aspects of the present invention, the nonaqueous solvent may contain ethylene carbonate at 5 mass % or more and less than 30 mass % relative to the sum of the mass of the nonaqueous solvent, and 1,3-dioxane may be contained at 0.3 to 3 mass % relative to the sum of the mass of the nonaqueous electrolyte.

Ethylene carbonate, though having high dielectricity and thus being useful as a nonaqueous solvent for the electrolyte, is easily oxidatively decomposed during high voltage charging. Therefore, it is preferable to restrict the content of the ethylene carbonate. If the content ratio of the ethylene carbonate is less than 5 mass %, a sufficient containing effect cannot be obtained, while in excess of 30 mass % the oxidative decomposition at the positive electrode increases, resulting in degradation of the cycle property. In view of this, the content ratio is preferably 5 mass % or more and less than 30 mass % relative to the sum of the mass of the nonaqueous solvent.

Further, the content ratio of the ethylene carbonate is preferably 5 mass % or more and less than 30 mass %, and 1,3-dioxane is preferably contained at 0.3 to 3 mass % relative to the sum of the mass of the nonaqueous electrolyte. With this configuration, a nonaqueous electrolyte secondary cell that is high in initial capacity, preservation recovery ratio, and cycle discharge capacity ratio (cycle property) is obtained.

The content of the 1,3-dioxane is 0.3 mass % or more relative to the mass of the nonaqueous electrolyte is because if the content is less than 0.3 mass % a sufficient effect of improving the preservation recovery ratio cannot be obtained, while the content is 3 mass % or less because if the content of the 1,3-dioxane increases, the initial capacity and the cycle property are degraded at a content in excess of 3 mass %, though the preservation recovery ratio improves. A possible reason for the degradation of the initial capacity and the cycle property caused by the increase in the content of the 1,3-dioxane is that since the 1,3-dioxane has a high solvation capability for lithium ions, once the lithium ions are solvated, desolvation becomes difficult, resulting in a decreased amount of supply of the lithium ions.

In any of the above aspects of the present invention, the nonaqueous electrolyte preferably contains as the electrolytic salt at least one of lithium bis(pentafluoroethane sulfonyl) imide and lithium bis(trifluoromethane sulfonyl)imide at 0.1 M or more and 0.5 M or less.

As described above, although adding the 1,3-dioxane in the nonaqueous electrolyte can significantly improve the preservation recovery ratio, when the 1,3-dioxane is added such a tendency is observed that the initial capacity and the cycle property are degraded. In view of this, containing at least one of lithium bis(pentafluoroethane sulfonyl)imide (LiBETI) and lithium bis(trifluoromethane sulfonyl)imide (LiTFSI) at 0.1 M or more and 0.5 M or less provides the effect of improving all of the initial capacity, the preservation recovery ratio, and the cycle property. It should be noted that when both LiBETI and LiTFSI are used, the total concentration of them is preferably 0.1 M or more and 0.5 M or less.

In any of the above aspects of the present invention, the potential of the positive electrode is preferably 4.4 V or more and 4.6 V or less based on lithium.

Securing the potential of the positive electrode within the above range can more stably realize a high-capacity nonaqueous electrolyte secondary cell with excellent preservation performance and cycle property.

Effects of the Invention

As has been described above, according to the present invention, the charging preservation performance of a high-voltage charge type nonaqueous electrolyte secondary cell can be significantly improved. Also according to an aspect of the present invention, the significant effect of improving the initial capacity and cycle performance as well as charging preservation performance can be obtained.

BEST MODE FOR CARRYING OUT THE INVENTION

To describe the best mode for carrying out the present invention, the examples of the present invention will be classified into a first example group, a second example group, and a third example group. It should be noted that the present invention will not be limited to the examples described below. Modifications are possible without departing from the scope of the present invention.

FIRST EXAMPLE GROUP

A first example group is drawn to examples where 1,3-dioxane is added to the nonaqueous electrolyte while no lithium phosphate is added to the positive electrode.

Example 1

<Preparation of the Positive Electrode>

Lithium cobalt oxide containing different elements was prepared in the following manner. Zirconium (Zr) of 0.15 mol % relative to cobalt (Co) and magnesium (Mg) of 0.5 mol % relative to cobalt were co-precipitated as hydroxides and subjected to a thermal decomposition reaction, thus obtaining tricobalt tetroxide ($Co_3O_4$) containing zirconium and magnesium. The tricobalt tetroxide was mixed with lithium carbonate, and then heated in an air atmosphere at 850° C. for 24 hours. This was ground in a mortar to an average particle diameter of 14 μm, thus preparing lithium cobalt compound oxide containing zirconium and magnesium (active material A).

Layered lithium nickel manganese oxide was prepared in the following manner. Lithium carbonate ($Li_2CO_3$) and co-precipitated hydroxide represented by $Ni_{0.33}Mn_{0.33}Cu_{0.34}$ $(OH)_2$ were mixed with one another, and then heated in an air atmosphere at 1000° C. for 20 hours. Then the baked product was ground in a mortar to an average particle diameter of 5 μm. Thus, layered lithium nickel manganese oxide (active material B) was prepared. An X-ray analysis of the crystal structure of the active material B confirmed a layer structure.

The active material A and the active material B were mixed with one another at a weight ratio of 7:3, thus preparing a positive electrode active material. Ninety-four mass parts of this positive electrode active material, 3 mass parts of carbon powder serving as a conductive agent, and 3 mass parts of polyvinylidene fluoride serving as a binding agent were mixed with each other, and this mixture was mixed with N-methylpyrrolidone (NMP), thus preparing a slurry. This slurry was applied to both surfaces of an aluminum current collector of 15 μm thick by doctor blading, and dried, thus preparing a positive electrode plate with active material layers on both surfaces of the positive electrode current collector. Then, the positive electrode plate was pressed by roller-press, thus preparing a positive electrode of 29.0 mm long on the shorter side.

<Preparation of the Negative Electrode>

Ninety-five mass parts of graphite as a negative electrode active material, 3 mass parts of carboxymethyl cellulose (CMC) serving as a thickening agent, and 2 mass parts of styrene-butadiene rubber (SBR) serving as a binding agent were dispersed in water, thus preparing a negative electrode slurry. This slurry was applied to both surfaces of a copper current collector of 8 μm thick by doctor blading, and dried, thus preparing a negative electrode plate with active material layers on both surfaces of the negative electrode current collector. Then, the negative electrode plate was pressed by roller-press, thus preparing a negative electrode of 31.0 mm long on the shorter side.

The amounts of application of the positive electrode and the negative electrode were adjusted such that the charge capacity ratio (negative electrode charge capacity/positive electrode charge capacity) at a portion where the positive electrode and the negative electrode faced one another would be 1.1 at a cell charge voltage of 4.4 V (a positive electrode charge potential of 4.5 V based on lithium), which served as a design reference.

<Preparation of the Nonaqueous Electrolyte>

Ethylene carbonate, propylene carbonate, methyl ethyl carbonate, and diethyl carbonate were mixed with each other at a mass ratio of 24.6/5.6/42.4/27.4 in the above order at 25° C., thus obtaining a mixture solvent. Then $LiPF_6$ was dissolved in the mixture solvent at 1.0 M (mol/liter), thus preparing an electrolyte solution. To this electrolyte solution, 1.0 mass % of 1,3-dioxane (DOX) was added, thus preparing a DOX-added nonaqueous electrolyte according to example 1.

The mass ratio of the components of the nonaqueous electrolyte without 1,3-dioxane contained therein is "$LiPF_6$/ethylene carbonate/propylene carbonate/methyl ethyl carbonate/diethyl carbonate=12.9/21.4/4.9/36.9/23.9". Adding 1.0 mass % of 1,3-dioxane to this results in "$LiPF_6$/ethylene carbonate/propylene carbonate/methyl ethyl carbonate/diethyl carbonate/1,3-dioxane=12.8/21.2/4.9/36.5/23.6/1.0".

<Preparation of the Cell>

The positive electrode and the negative electrode with a separator made of a porous film of polyethylene were wound with a winder and pressed into an electrode assembly. This electrode assembly and the above DOX-added nonaqueous electrolyte were put into a prismatic cell casing, thus completing a prismatic nonaqueous electrolyte secondary cell (5 mm thick×34 mm wide×36 mm high) according to example 1 with a theoretical capacity of 820 mAh.

Example 2

A nonaqueous electrolyte secondary cell according to example 2 was prepared in the same manner as that in example 1 except that 0.5 mass % of vinylene carbonate (VC) was added to the nonaqueous electrolyte solution of example 1 before addition of 1,3-dioxane.

Example 3

A nonaqueous electrolyte secondary cell according to example 3 was prepared in the same manner as that in example 1 except that 2.0 mass % of vinylene carbonate (VC) was added to the nonaqueous electrolyte solution of example 1 before addition of 1,3-dioxane.

The mass ratio of the components of the nonaqueous electrolyte solution before addition of 1,3-dioxane is "$LiPF_6$/ethylene carbonate/propylene carbonate/methyl ethyl carbonate/diethyl carbonate/vinylene carbonate=12.6/21.0/4.8/36.2123.4/2.0".

Example 4

A nonaqueous electrolyte secondary cell according to example 4 was prepared in the same manner as that in example 1 except that 5.0 mass % of vinylene carbonate (VC) was added to the nonaqueous electrolyte solution of example 1 before addition of 1,3-dioxane.

Example 5

A nonaqueous electrolyte secondary cell according to example 5 was prepared in the same manner as that in example 1 except that 6.0 mass % of vinylene carbonate (VC) was added to the nonaqueous electrolyte solution of example 1 before addition of 1,3-dioxane.

Example 6

A nonaqueous electrolyte secondary cell according to example 6 was prepared in the same manner as that in example 3 except that the amount of addition of 1,3-dioxane (DOX) was 0.1 mass % relative to the nonaqueous electrolyte solution of example 3 before addition of 1,3-dioxane.

Example 7

A nonaqueous electrolyte secondary cell according to example 7 was prepared in the same manner as that in example 3 except that the amount of addition of 1,3-dioxane (DOX) was 0.3 mass % relative to the nonaqueous electrolyte solution of example 3 before addition of 1,3-dioxane.

Example 8

A nonaqueous electrolyte secondary cell according to example 8 was prepared in the same manner as that in example 3 except that the amount of addition of 1,3-dioxane (DOX) was 0.5 mass % relative to the nonaqueous electrolyte solution of example 3 before addition of 1,3-dioxane.

Example 9

A nonaqueous electrolyte secondary cell according to example 9 was prepared in the same manner as that in example 3 except that the amount of addition of 1,3-dioxane (DOX) was 3.0 mass % relative to the nonaqueous electrolyte solution of example 3 before addition of 1,3-dioxane.

Example 10

A nonaqueous electrolyte secondary cell according to example 10 was prepared in the same manner as that in example 3 except that the amount of addition of 1,3-dioxane (DOX) was 5.0 mass % relative to the nonaqueous electrolyte solution of example 3 before addition of 1,3-dioxane.

Example 11

A nonaqueous electrolyte secondary cell according to example 11 was prepared in the same manner as that in example 3 except that to the mixture solvent of "ethylene carbonate/propylene carbonate/methyl ethyl carbonate/diethyl carbonate/vinylene carbonate=24.0/5.5/41.4/26.8/2.3 (mass ratio)" of example 3, 0.8 M of $LiPF_6$ and 0.2 M of lithium bis(pentafluoroethane sulfonyl)imide (LiBETI) were added.

Example 12

A nonaqueous electrolyte secondary cell according to example 12 was prepared in the same manner as that in example 3 except that to the mixture solvent of "ethylene carbonate/propylene carbonate/methyl ethyl carbonate/diethyl carbonate/vinylene carbonate=24.0/5.5/41.4/26.8/2.3 (mass ratio)" of example 3, 0.8 M of $LiPF_6$ and 0.2 M of lithium bis(trifluoromethane sulfonyl)imide (LiTFSI) were added. Example 12 differs from example 1 in that LiTFSI is used instead of LiBETI.

Example 13

A nonaqueous electrolyte secondary cell according to example 13 was prepared in the same manner as that in example 3 except that to the mixture solvent of "ethylene carbonate/propylene carbonate/methyl ethyl carbonate/diethyl carbonate/vinylene carbonate=24.0/5.5/41.4/26.8/2.3 (mass ratio)" of example 3, 0.8 M of $LiPF_6$, 0.1 M of lithium bis(pentafluoroethane sulfonyl)imide (LiBETI), and 0.1 M of lithium bis(trifluoromethane sulfonyl)imide (LiTFSI) were added.

Example 14

A nonaqueous electrolyte secondary cell according to example 14 was prepared in the same manner as that in example 3 except that to the mixture solvent of "ethylene carbonate/propylene carbonate/methyl ethyl carbonate/diethyl carbonate/vinylene carbonate=24.0/5.5/41.4/26.8/2.3 (mass ratio)" of example 3, 0.5 M of $LiPF_6$ and 0.5 M of lithium bis(pentafluoroethane sulfonyl)imide (LiBETI) were added.

Comparative Example 1

A nonaqueous electrolyte secondary cell according to comparative example 1 was prepared in the same manner as that in example 3 except that no 1,3-dioxane was added to the nonaqueous electrolyte solution.

The nonaqueous electrolyte in comparative example 1 is such that 1 M of LiPF$_6$ is dissolved in the mixture solvent of "ethylene carbonate/propylene carbonate/methyl ethyl carbonate/diethyl carbonate/vinylene carbonate=24.0/5.5/41.4/26.8/2.3 (mass ratio)", and no 1,3-dioxane is added.

The initial capacity, the cycle discharge capacity ratio, and the preservation recovery ratio of each of the cells of the above examples and comparative example were measured. The results are listed in Table 1 together with cell configuration conditions.

<Initial Capacity and Cycle Discharge Capacity Ratio>

Each cell was subjected to constant current/constant voltage charging at a cell voltage of 4.38 V (approximately 4.48 V as a positive electrode charge potential based on lithium) and 820 mA (1 It). Then, a step of constant-current discharging of each cell at 820 mA to a cell voltage of 3 V was carried out. The constant current/constant voltage charging and the constant-current discharging were assumed to constitute one cycle, and the discharge capacity in the first cycle was measured, which was determined as a initial capacity. This cycle was repeated 300 times at room temperature, and the discharge capacity in the 300th cycle was measured so as to obtain the ratio (percentage) of the 300th-cycle discharge capacity to the initial capacity, which was determined as a cycle discharge capacity ratio (%).

<Preservation Recovery Ratio>

Each cell was subjected to constant current/constant voltage charging at a cell voltage of 4.38 V (approximately 4.48 V as a positive electrode charge potential based on lithium) and 820 mA (1 It). Then, a step of constant-current discharging of each cell at 164 mA (0.2 It) to a cell voltage of 3-V was carried out, and then each cell was subjected to constant current/constant voltage charging and preserved for 20 days at 60° C. After 20 days of preservation, each cell was subjected to constant-current discharging under the same conditions as those before preservation so as to measure the discharge capacity. The ratio (percentage) of the discharge capacity to the initial capacity was obtained, which was determined as a preservation recovery ratio (%).

same conditions except the presence or absence of 1,3-dioxane (DOX) and the amount of addition thereof, and in a comparison of example 1, which contained no vinylene carbonate (VC) and 1 mass % of 1,3-dioxane, with comparative example 1, which contained 2 mass % of vinylene carbonate and no 1,3-dioxane (see Table 1), the preservation recovery ratio of each of the examples, which all contained 1,3-dioxane, was higher than that (73%) of comparative example 1, which contained no 1,3-dioxane. These results show that adding 1,3-dioxane to the electrolyte improves the preservation recovery ratio of high-voltage charge type nonaqueous electrolyte secondary cells.

In examples 3 and 6 to 10, in which the amount of vinylene carbonate was constantly 2 mass % and the amount of addition of 1,3-dioxane was varied between 0.1 and 5.0 mass %, the initial capacity, the preservation recovery ratio, and the cycle discharge capacity ratio were all satisfactory when the amount of 1,3-dioxane was between 0.3 to 3.0 mass %. Meanwhile, in example 6, in which the amount of addition of 1,3-dioxane was 0.1 mass %, the preservation recovery ratio was smaller than that in the other examples, and in example 10, in which the amount of addition of 1,3-dioxane was 5.0 mass %, the cycle discharge capacity ratio was smaller than that in the other examples. These results show that the amount of addition of 1,3-dioxane is preferably 0.3 to 3.0 mass % relative to the mass of the nonaqueous electrolyte.

Next, the advantageous effects of vinylene carbonate will be described. In examples 1 to 5, in which 1,3-dioxane was constantly 1 mass % with a varied amount of vinylene carbonate of 0, 0.5, 2.0, 5.0, and 6.0 mass %, respectively, such a tendency was observed that when vinylene carbonate was contained, and as the content thereof increased, the preservation recovery ratio and the cycle discharge capacity ratio increased. Also such a tendency was observed that when the content of vinylene carbonate was too small, sufficient advantageous effects could not be obtained while when the content was too large the initial capacity was degraded. These results show that containing vinylene carbonate in the nonaqueous electrolyte improves the preservation recovery ratio and the cycle discharge capacity ratio, and that the content of vinylene carbonate is preferably 0.5 to 5.0 mass % relative to

TABLE 1

| | DOX (mass %) | VC (mass %) | LiPF$_6$ (M) | LiBETI (M) | LiTFSI (M) | Initial Capacity [mAh] | Preservation recovery ratio (%) | 300th cycle discharge capacity ratio |
|---|---|---|---|---|---|---|---|---|
| Example 1 | 1.0 | 0 | 1 | 0 | 0 | 855 | 82 | 62 |
| Example 2 | 1.0 | 0.5 | 1 | 0 | 0 | 856 | 85 | 77 |
| Example 3 | 1.0 | 2.0 | 1 | 0 | 0 | 847 | 88 | 80 |
| Example 4 | 1.0 | 5.0 | 1 | 0 | 0 | 841 | 87 | 83 |
| Example 5 | 1.0 | 6.0 | 1 | 0 | 0 | 833 | 84 | 81 |
| Example 6 | 0.1 | 2.0 | 1 | 0 | 0 | 850 | 76 | 82 |
| Example 7 | 0.3 | 2.0 | 1 | 0 | 0 | 850 | 81 | 82 |
| Example 8 | 0.5 | 2.0 | 1 | 0 | 0 | 848 | 83 | 82 |
| *Example 3 | 1.0 | 2.0 | 1 | 0 | 0 | 847 | 88 | 80 |
| Example 9 | 3.0 | 2.0 | 1 | 0 | 0 | 844 | 90 | 79 |
| Example 10 | 5.0 | 2.0 | 1 | 0 | 0 | 829 | 91 | 73 |
| *Example 3 | 1.0 | 2.0 | 1 | 0 | 0 | 847 | 88 | 80 |
| Example 11 | 1.0 | 2.0 | 0.8 | 0.2 | 0 | 855 | 90 | 85 |
| Example 12 | 1.0 | 2.0 | 0.8 | 0 | 0.2 | 853 | 89 | 82 |
| Example 13 | 1.0 | 2.0 | 0.8 | 0.1 | 0.1 | 858 | 92 | 84 |
| Example 14 | 1.0 | 2.0 | 0.5 | 0.5 | 0 | 849 | 93 | 81 |
| Comparative Example 1 | 0 | 2.0 | 1 | 0 | 0 | 853 | 73 | 83 |

On the basis of Table 1, the advantageous effects of 1,3-dioxane will be described. In a comparison of examples 6, 7, 3, 8, 9, and 10 with comparative example 1, which had the the electrolyte. The advantageous effects of LiBETI and LiTFSI will be described. In a comparison of comparative example 1 with example 3 and the like, addition of 1,3- dioxane improved the preservation recovery ratio while the tendency of degrading the initial capacity and the cycle discharge capacity ratio was observed. The use of, together with $LiPF_6$, either one of bis(pentafluoroethane sulfonyl)imide (LiBETI) and lithium bis(trifluoromethane sulfonyl)imide (LiTFSI) or the use of both significantly improved the initial capacity and the cycle discharge capacity ratio.

That is, in comparison example 1 and examples 3 and 11 to 14, the initial capacity in comparison example 1 was 853 mAh and the cycle discharge capacity ratio in comparison example 1 was 83% while in example 3, which contained 1,3-dioxane and neither LiBETI nor LiTFSI, the initial capacity was 847 mAh and the cycle discharge capacity ratio was 80%. Thus, the initial capacity and the cycle discharge capacity ratio in example 3 were inferior to those in comparative example 1. Meanwhile, in examples 10 to 13, which contained either one or both of LiBETI and LiTFSI together with $LiPF_6$, the initial capacity and the cycle discharge capacity ratio improved over those in example 3.

In respect of the content of LiBETI and LiTFSI, satisfactory advantageous effects were observed at 0.1 M or more while at 0.5 M or more the tendency of degrading the initial capacity was observed. Thus, the content is preferably 0.1M or more and 0.5 M or less relative to the nonaqueous electrolyte.

Incidentally, the degree of effect of improving the preservation recovery ratio by 1,3-dioxane is influenced by the composition of the nonaqueous electrolyte, but the effect itself can be obtained regardless of the composition of the nonaqueous electrolyte. The operation mechanism of LiBETI and LiTFSI is possibly such that LiBETI and LiTFSI sterically hinder the incorporation of lithium ions in 1,3-dioxane due to salvation, thereby facilitating the desolvation of the lithium ions.

SECOND EXAMPLE GROUP

A second example group is drawn to examples where 1,3-dioxane is added to the nonaqueous electrolyte while lithium phosphate is added to the positive electrode.

Example 2-1

Preparation of the Positive Electrode

An active material A and an active material B prepared in a similar manner to that in example 1 of the first example group were mixed with one another at a weight ratio of 7:3, thus preparing a positive electrode active material. With 99 mass parts of this positive electrode active material, 1 mass part of lithium phosphate of an average particle diameter of 2 μm was mixed. Next, 94 mass parts of this mixture, 3 mass parts of carbon powder serving as a conductive agent, and 3 mass parts of polyvinylidene fluoride serving as a binding agent were mixed with each other, and this mixture was mixed with N-methylpyrrolidone (NMP), thus preparing a slurry. This slurry was applied to both surfaces of an aluminum current collector of 15 μm thick by doctor blading, and dried, thus preparing a positive electrode plate with active material layers on both surfaces of the positive electrode current collector. Then, the positive electrode plate was pressed by roller-press, thus preparing a positive electrode of 29.0 mm long on the shorter side.

The average particle diameter (median diameter) of the lithium phosphate was measured with a laser diffraction-type particle size distribution measuring apparatus (SALD-2000J, available from Shimadzu Corporation) after the lithium phosphate was well dispersed in distilled water with ultrasound or a surface active agent.

<Preparation of the Negative Electrode>

The negative electrode was prepared in the same manner as that in example 1.

<Preparation of the Nonaqueous Electrolyte>

Ethylene carbonate, propylene carbonate, methyl ethyl carbonate, diethyl carbonate, and vinylene carbonate were mixed with each other at a mass ratio of 24.015.5/41.4/26.8/2.3 in the above order at 25° C., thus obtaining a mixture solvent. In the mixture solvent, 0.8 M of $LiPF_6$ and 0.2 M of bis(trifluoromethane sulfonyl)imide (LiTFSI) were dissolved, thus preparing an electrolyte solution. To this electrolyte solution, 2.0 mass % of 1,3-dioxane (DOX) was added, thus preparing a DOX-added nonaqueous electrolyte according to example 2-1.

<Preparation of the Cell>

A nonaqueous electrolyte secondary cell according to example 2-1 was prepared in the same manner as that in example 1.

Comparative Example 2-1

A nonaqueous electrolyte secondary cell according to comparative example 2-1 was prepared in the same manner as that in example 2-1 except that no 1,3-dioxane was added to the nonaqueous electrolyte solution and no lithium phosphate was added to the positive electrode.

Example 2-2

While a DOX-added nonaqueous electrolyte to which 2.0 mass % of 1,3-dioxane was added was used, no lithium phosphate was added to the positive electrode. A nonaqueous electrolyte secondary cell according to example 2-2 was prepared in the same manner as that in example 2-1 except for the above respect.

Comparative Example 2-2

While no 1,3-dioxane was added to the nonaqueous electrolyte solution, lithium phosphate was added at 1 mass % relative to the total mass of the positive electrode and the lithium phosphate. That is, the positive electrode was similar to that described in example 2-1. A nonaqueous electrolyte secondary cell according to comparative example 2-2 was prepared in the same manner as that in example 2-2 except for the above respect.

Similarly to the first example group, the initial capacity and preservation recovery ratio of each of the cells of examples 2-1 and 2-2 and comparative examples 2-1 and 2-2 were measured. Further, after preservation, the discharge capacity of each cell was measured when they were discharged at 820 mA (1 It) to a cell voltage 3 V so as to obtain the ratio (percentage) of the after-preservation 1 It discharge capacity to the initial capacity, which was determined an after-preservation 1 It discharge rate (%). The results are listed in Table 2 together with cell configuration conditions.

TABLE 2

| | DOX mass % | VC mass % | LiPF$_6$ (M) | LiBETI | LiTFSI (M) | Addition of lithium phosphate to positive electrode main component (*) mass % | Initial capacity mAh | Preservation recovery ratio % | After-preservation 1 It discharge rate % |
|---|---|---|---|---|---|---|---|---|---|
| Example 2-1 | 2.0 | 2.0 | 0.8 | 0 | 0.2 | 1.0 | 846 | 92 | 83 |
| Comparative Example 2-1 | 0 | 2.0 | 0.8 | 0 | 0.2 | 0 | 854 | 73 | 61 |
| Example 2-2 | 2.0 | 2.0 | 0.8 | 0 | 0.2 | 0 | 851 | 81 | 67 |
| Comparative Example 2-2 | 0 | 2.0 | 0.8 | 0 | 0.2 | 1.0 | 849 | 78 | 68 |

The positive electrode main component (*) means the total mass of the positive electrode active material and the lithium phosphate.

The results listed in Table 2 reveal the following. Comparative example 2-1 and comparative example 2-2, in which no 1,3-dioxane was added, were poor in preservation recovery ratio (73% and 78%, respectively) and after-preservation 1 It discharge rate (61% and 68%, respectively). In example 2-2, in which 2.0 mass % of 1,3-dioxane was added, the preservation recovery ratio was 81%, which was an improvement over comparative example 2-1, but the value of the after-preservation 1 It discharge rate was as small as 67%.

Meanwhile, in example 2-1, in which 2.0 mass % of 1,3-dioxane was added relative to the total mass of the nonaqueous electrolyte and 1.0 mass % of lithium phosphate was added relative to the total mass of the positive electrode active material and the lithium phosphate, the values of the preservation recovery ratio and the after-preservation 1 It discharge rate were as significantly high as 92% and 83%, respectively. These results reveal that adding 1,3-dioxane to the nonaqueous electrolyte and containing lithium phosphate in the positive electrode significantly improve cell performance.

Concerning the content ratio of lithium phosphate to the positive electrode, since lithium phosphate is not an active material, increasing the content ratio thereof reduces the discharge capacity. In view of this, the ratio of the amount of lithium phosphate relative to the total mass of the positive electrode and lithium phosphate is preferably 0.01 mass % or more and 5 mass % or less. This is because if the amount of the lithium phosphate is less than 0.01 mass %, a sufficient effect cannot be observed, while in excess of 5 mass % the effect of reducing the amount of the positive electrode active material (negative effect) overwhelms the effect of adding the lithium phosphate. In view of these circumstances, the ratio of the lithium phosphate is preferably 0.01 mass % or more and 5 mass % or less, more preferably 0.03 mass % or more and 1 mass % or less.

THIRD EXAMPLE GROUP

In a third example group, we examined the difference in cell performance between cells that used, as the negative electrode active material, noncrystalline carbon-covered graphite particles covered with noncrystalline carbon on the surfaces of the graphite particles and cells that used graphite particles themselves as the negative electrode active material.

Example 3-1

A hundred mass parts of coke powder with an average particle diameter of 5 μm, 40 mass parts of tar pitch, 25 mass parts of silicon carbide with an average particle diameter of 48 μm, and 20 mass parts of coal tar were mixed with each other at 270° C. for an hour. The obtained mixture was grounded and pressure-molded into the pellet form. The pellets were heated in nitrogen of 900° C. and graphitized with the use of an Acheson furnace at 3000° C. Then the graphite was grounded with a hammer mill and passed through a JIS standard sieve (75 μm apertures) for grading. This product will be referred to as graphite particles.

Six hundred grams of the above graphite particles was put into a planetary mixer together with 1000 g of creosote oil in which 7.5 g of petroleum-based pitch having a softening point of 230 to 265° C. and a carbonization degree of 80% was dissolved, and these were mixed at room temperature for an hour. The temperature of the obtained pitch-covered graphite particles was heated to 900° C. at a temperature raising speed of 20° C./hr under nitrogen atmosphere, and the particles were left at this temperature for an hour, thus preparing noncrystalline carbon-covered graphite particles.

The above noncrystalline carbon-covered graphite particles were passed through a JIS standard sieve (63 μm apertures), thus obtaining a negative electrode active material. A negative electrode according to example 3-1 was prepared in the same manner as that in example 1 except that this negative electrode active material was used.

Lithium cobalt compound oxide containing zirconium and magnesium (active material A) and layered lithium nickel manganese oxide (active material B) prepared in the same manner as that in example 1 were mixed with one another at a weight ratio of 9:1, thus preparing a positive electrode active material. A positive electrode according to example 3-1 was prepared in the same manner as that in example 1 except that this positive electrode active material was used.

In a solvent in which ethylene carbonate (EC), propylene carbonate (PC), methyl ethyl carbonate (MEC), and diethyl carbonate (DEC) were mixed with each other at a mass ratio of 24.6/5.6/42.4/27.4, 1.0 M of LiPF$_6$ and 0.2 M of LiTFSI were dissolved, thus obtaining an electrolyte solution.

To the above electrolyte solution, 2.0 mass % of vinylene carbonate (VC) and 1 mass % of 1,3-dioxane (DOX) were added, thus preparing a DOX-added nonaqueous electrolyte. The mass ratio of the components of this DOX-added nonaqueous electrolyte is "LiPF$_6$/LiTFSI/EC/PC/MEC/DEC/VC/DOX=12.1/4.6/19.8/4.5/34.0/22.0/2.0/1.0".

The positive electrode and the negative electrode with a separator made of a porous film of polyethylene were wound and pressed into an electrode assembly. This electrode assembly and the above DOX-added nonaqueous electrolyte were put into a prismatic cell casing, thus preparing a prismatic nonaqueous electrolyte secondary cell with a theoretical capacity of 820 mAh according to example 3-1. Similarly to example 1, the amounts of application of the positive electrode and the negative electrode were adjusted such that the charge capacity ratio (negative electrode charge capacity/positive electrode charge capacity) at a portion where the positive electrode and the negative electrode faced one another would be 1.1 at a cell charge voltage of 4.4 V (a positive electrode charge potential of 4.5 V based on lithium), which served as a design reference.

Example 3-2

The above graphite particles themselves were rendered the negative electrode active material, and this was used to prepare a negative electrode. A prismatic nonaqueous electrolyte secondary cell according to example 3-2 was prepared in the same manner as that in example 3-1 except for this respect.

The negative electrode active materials prepared in examples 3-1 and 3-2 were subjected to a differential thermal analysis (DTA) with a differential thermal analyzer. The measurement was carried out using a simultaneous measurement instrument of thermo-gravimetric/differential thermal analysis (EXSTAR 6000, TG/DTA) available from Seiko Instruments Inc. with α-alumina as a reference material. Approximately 10 mg of the measurement object material (noncrystalline carbon-covered graphite particles) was placed on a sample saucer made of platinum, and dry air of 300 ml/min was introduced on the circumference of the measurement object material under such temperature rising conditions that the temperature rising speed between room temperature and 450° C. was 15° C./min and the temperature rising speed between 450° C. and 620° C. was 5° C./min.

For each of the cells according to examples 3-1 and 3-2, the initial capacity, the discharge capacity ratio and amount of cell swelling after 100 cycles at 45° C., the 3 It charge capacity ratio, and the preservation recovery ratio were measured. The measurement of the initial capacity of each cell was carried out in the same manner as that in the first example group, and the conditions for the 100 cycles at 45° C. were the same as the conditions described in the first example group except that the test environment temperature was set at 45° C. and the number of cycles was set at 100. As the amount of cell swelling, the difference in thickness of the cell before and after the 100 cycles test was measured. The shape of the cells of the examples is cuboid with opposing faces approximately parallel to each other. Among the three pairs of opposing faces of the cuboid, a pair having the shortest distance therebetween is assumed the above thickness.

The 3 It charge capacity ratio was measured in the following manner. Each cell was charged at a constant current of 820 mAh (1 It) theoretical capacity to a cell voltage of 4.38 V, thus measuring a 1 It charge capacity. Meanwhile, a cell of the same kind as the above cells was charged under the same cell voltage conditions as the above and at a constant current of three times (3 It) the 820 mAh theoretical capacity to a cell voltage of 4.38 V, thus measuring a 3 It charge capacity. The value obtained by dividing the 3 It charge capacity by the 1 It charge capacity was assumed the 3 It charge capacity ratio.

The preservation recovery ratio was measured under the same conditions as the conditions described in the first example group.

The results are listed in Table 3.

TABLE 3

| | Heating peak at 550-620° C. by differential thermal analysis | | 45° C. · 100 cycles test | | | |
| --- | --- | --- | --- | --- | --- | --- |
| | Observed or not | Peak area | Initial capacity | 3 It charge capacity ratio | Discharge capacity ratio | Cell swelling | Preservation recovery ratio |
| Example 3-1 | Observed | 448 μV·s/mg | 857 mAh | 45% | 91% | +0.48 | 86% |
| Example 3-2 | Not observed | — | 860 mAh | 34% | 88% | +0.53 | 84% |

Table 3 shows that with the noncrystalline carbon-covered graphite particles (negative electrode active material according to example 3-1), a heating peak appeared in the temperature range of 550 to 620° C., and the peak area of this heating peak was 448 pV·s/mg. This heating peak is possibly caused by the noncrystalline carbon present on the surfaces of the graphite particles.

Table 3 also shows that as compared with example 3-2 using a negative electrode active material of graphite particles not covered with noncrystalline carbon, example 3-1 using a negative electrode active material of graphite particles covered with noncrystalline carbon on the surfaces improved in 3 It charge capacity ratio by as high as 11 percentage points. This is possibly because the existence of the noncrystalline carbon covering layer on the surface of the negative electrode active material improved the acceptability of lithium.

Also, example 3-1 had a high discharge capacity ratio (91%) after 100 cycles at 45° C. as compared with example 3-2 (88%) and was small in cell swelling as compared with example 3-2. Further, example 3-1 had a high preservation recovery ratio as compared with example 3-2 (84% 86%).

These confirmed that cell performance further improves if the nonaqueous electrolyte secondary cell is configured by using a positive electrode having a positive electrode active material containing a lithium element, an electrolyte containing 1,3-dioxane, and a negative electrode having a negative electrode active material of noncrystalline carbon-covered graphite particles made of graphite particles covered with noncrystalline carbon.

The peak area of the heating peak at the temperature of 550 to 620° C. possibly indicates the degree of crystallinity of the carbon that covers the surfaces of the graphite particles. The peak area of the noncrystalline carbon-covered graphite particles according to example 3-1 was 448 μV·s/mg, and it is confirmed that at a peak area of 100 μV·s/mg or more the effect of using the noncrystalline carbon as a covering can be obtained. Meanwhile, if the peak area of the noncrystalline carbon-covered graphite particles exceeds 500 μV·s/mg, the discharge capacity of the negative electrode significantly reduces. In view of this, the peak area of the heating peak at the temperature of 550 to 620° C. was set at 100 μV·s/mg or more and 500 μV·s/mg or less.

(Supplemental Remarks)

While in the above first and second example groups a positive electrode active material in which lithium cobalt compound oxide containing zirconium and magnesium (active material A) and layered lithium nickel manganese oxide (active material B) are mixed with one another at a ratio of 7:3 is used, the positive electrode active material will not be limited to this. However, for the positive electrode active material made of the mixture of the active materials A and B, if the content of the lithium cobalt compound oxide in the positive electrode active material is less than 51 mass %, the cell capacity, the cycle property, and the preservation property may be degraded, while if the content of the layered lithium nickel manganese oxide is less than 5 mass %, the effect of improving the thermal stability of the positive electrode active material at high potential cannot be sufficiently obtained. In view of this, the mass ratio of the lithium cobalt compound oxide and the layered lithium nickel manganese oxide is preferably 51:49 to 95:5, more preferably 70:30 to 90:10. The lithium cobalt compound oxide may contain other metal elements than zirconium and magnesium, and the layered lithium nickel manganese oxide may contain other metal elements than cobalt.

Also in the present invention, the nonaqueous electrolyte may contain some other solvent than the one used in the above examples. For example, nonaqueous solvents usable in the present invention include ethylene carbonate, propylene carbonate, butylene carbonate, fluoroethylene carbonate, 1,2-cyclohexyl carbonate, cyclopentanone, sulfolane, 3-methyl sulfolane, 2,4-dimethyl sulfolane, 3-methyl-1,3-oxazolidine-2-one, dimethyl carbonate, methyl ethyl carbonate, diethyl carbonate, methylpropyl carbonate, methylbutyl carbonate, ethylpropyl carbonate, ethylbutyl carbonate, dipropyl carbonate, γ-butyrolactone, γ-valerolactone, 1,2-dimethoxyethane, tetrahydrofuran, 2-methyltetrahydrofuran, 1,3-dioxolane, methyl acetate, ethyl acetate, and 1,4-dioxane. In view of improving the charge/discharge efficiency, a mixture solvent in which, among the foregoing, ethylene carbonate (EC) is mixed with chain carbonate such as dimethyl carbonate (DMC), methyl ethyl carbonate (MEC), and diethyl carbonate (DEC) is preferably used. More preferably, as chain carbonate, asymmetric chain carbonate such as MEC is used. When DMC is used as chain carbonate, the content ratio is preferably 0 volume % or more and 40 volume % or less. When MEC is used as chain carbonate, the content ratio is preferably 30 volume % or more and 80 volume % or less. When DEC is used as chain carbonate, the content ratio is preferably 20 volume % or more and 50 volume % or less.

As the electrolytic salt for the nonaqueous electrolyte in the present invention, various known lithium salts are conventionally usable, and examples of the lithium salts include $LiPF_6$, $LiBF_4$, $LiCF_3SO_3$, $LiN(CF_3SO_2)_2$, $LiN(C_2F_5SO_2)_2$, $LiN(CF_3SO_2)(C_4F_9SO_2)$, $LiC(CF_3SO_2)_3$, $LiC(C_2F_5SO_2)_3$, $LiAsF_6$, $LiClO_4$, $Li_2B_{10}Cl_{10}$, $Li_2B_{12}Cl_{12}$, and a mixture of the foregoing.

When the cell is charged at high charging voltage, aluminum used as the current collector of the positive electrode usually tends to be dissolved. In the presence of $LiPF_6$, however, a covering resulting from decomposition of $LiPF_6$ is formed on the surface of the aluminum, so that the covering inhibits the dissolution of the aluminum. Thus, $LiPF_6$ is preferably used as the lithium salt. In this case, the amount of the electrolytic salt dissolved in the nonaqueous electrolyte is preferably 0.5 to 2.0 M.

As a preferable negative electrode usable in the present invention, any of carbonaceous materials capable of intercalating and deintercalating lithium ions, especially artificial graphite and natural graphite, are exemplified.

INDUSTRIAL APPLICABILITY

As has been described hereinbefore, the present invention significantly improves the preservation recovery ratio of nonaqueous electrolyte secondary cells used with the positive electrode charged to high potential, and as well as the preservation recovery ratio, the present invention improves the cell capacity and the cycle discharge property. Therefore, the industrial significance of the present invention is considerable.

What is claimed is:

1. A nonaqueous electrolyte secondary cell comprising:
    a positive electrode having a positive electrode active material containing a lithium element;
    a negative electrode having a negative electrode active material; and
    a nonaqueous electrolyte having a nonaqueous solvent and an electrolytic salt, wherein:
        the positive electrode active material is a mixture of lithium cobalt compound oxide and lithium manganese nickel compound oxide having a layer structure, the lithium cobalt compound oxide containing at least one element selected from the group consisting of Mg, Al, Ti, and Zr;
        a potential of the positive electrode is more than 4.3 V and 5.1 V or less based on lithium; and
        the nonaqueous electrolyte contains 1,3-dioxane.

2. The nonaqueous electrolyte secondary cell according to claim 1, wherein the positive electrode contains lithium phosphate.

3. The nonaqueous electrolyte secondary cell according to claim 2, wherein a ratio of the lithium phosphate to a total mass of the positive electrode active material and the lithium phosphate is 0.01 mass % or more and 5 mass % or less.

4. The nonaqueous electrolyte secondary cell according to claim 1, wherein:
    the negative electrode active material is made of noncrystalline carbon-covered graphite particles, a surface of each of the graphite particles being covered with a covering layer containing noncrystalline carbon; and
    the noncrystalline carbon-covered graphite particles have a heating peak at 550° C. or higher and 620° C. or lower according to a differential thermal analysis in an air atmosphere, the heating peak having a peak area of 100 µVs/mg or more and 500 Vs/mg or less at a temperature rising rate of 5° C/min.

5. The nonaqueous electrolyte secondary cell according to claim 1, wherein the nonaqueous solvent contains vinylene carbonate at 0.5 mass % or more and 5 mass % or less relative to a total mass of the nonaqueous solvent.

6. The nonaqueous electrolyte secondary cell according to claim 1, wherein:
    the nonaqueous solvent contains ethylene carbonate at 5 mass % or more and less than 30 mass % relative to a sum of the mass of the nonaqueous solvent,
    the nonaqueous electrolyte contains 1,3-dioxane at 0.3 to 3 mass % relative to a total mass of the nonaqueous electrolyte.

7. The nonaqueous electrolyte secondary cell according to claim 1, wherein the nonaqueous electrolyte contains as the electrolytic salt at least one of lithium bis(pentafluoroethane sulfonyl)imide and lithium bis(trifluoromethane sulfonyl)imide at 0.1 M or more and 0.5 M or less.

8. The nonaqueous electrolyte secondary cell according to claim 1, wherein the potential of the positive electrode is 4.4 V or more and 4.6 V or less based on lithium.

* * * * *

UNITED STATES PATENT AND TRADEMARK OFFICE
CERTIFICATE OF CORRECTION

| | |
|---|---|
| PATENT NO. | : 8,021,787 B2 |
| APPLICATION NO. | : 12/302713 |
| DATED | : September 20, 2011 |
| INVENTOR(S) | : Masato Iwanaga et al. |

It is certified that error appears in the above-identified patent and that said Letters Patent is hereby corrected as shown below:

In claim 4, Column 18, line 43:
Change

"500Vs/mg"

To be

--500 μVs/mg--

Signed and Sealed this
Twelfth Day of June, 2012

David J. Kappos
*Director of the United States Patent and Trademark Office*